(12) United States Patent
Zhang et al.

(10) Patent No.: US 8,891,498 B2
(45) Date of Patent: Nov. 18, 2014

(54) METHOD FOR WIRELESS NETWORK RE-SELECTION IN A PLURALITY OF NETWORKS ENVIRONMENT

(75) Inventors: Wenlin Zhang, Guangdong (CN); Hai Zhang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1738 days.

(21) Appl. No.: 11/484,384

(22) Filed: Jul. 11, 2006

(65) Prior Publication Data
US 2007/0019580 A1 Jan. 25, 2007

Related U.S. Application Data

(63) Continuation of application No. PCT/CN2005/000078, filed on Jan. 18, 2005.

(30) Foreign Application Priority Data

Jan. 21, 2004 (CN) .......................... 2004 1 0039033

(51) Int. Cl.
H04W 4/00 (2009.01)
H04W 48/18 (2009.01)
H04W 74/00 (2009.01)
H04W 84/12 (2009.01)

(52) U.S. Cl.
CPC .............. *H04W 48/18* (2013.01); *H04W 74/00* (2013.01); *H04W 84/12* (2013.01)
USPC .......................................... 370/338; 455/436

(58) Field of Classification Search
USPC ....................... 455/432.1, 436, 448
See application file for complete search history.

(56) References Cited

U.S. PATENT DOCUMENTS

| 7,610,014 | B2* | 10/2009 | Buckley ........................ 455/41.2 |
| 2003/0003895 | A1* | 1/2003 | Wallentin et al. ............. 455/410 |
| 2003/0206533 | A1* | 11/2003 | Charas ........................ 370/328 |
| 2004/0042437 | A1* | 3/2004 | Sheynman et al. ........... 370/342 |
| 2004/0148352 | A1* | 7/2004 | Menon et al. ................. 709/205 |
| 2004/0192295 | A1* | 9/2004 | Tsao et al. ................. 455/432.1 |
| 2005/0254469 | A1* | 11/2005 | Verma et al. ................ 370/338 |

FOREIGN PATENT DOCUMENTS

| JP | 2003-110569 | 4/2003 |
| WO | WO 03/030433 A2 | 4/2003 |

OTHER PUBLICATIONS

M. Cappiello et al: "Mobility amongst Heterogeneous Networks with AAA Support", ICC 2002, 2002 IEEE International Conference on Communications. Conference Proceedings, New York, NY, Apr. 28-May 2, 2002, IEEE International Conference on Communications, New York, NY, IEEE, US, vol. vol. 1 of 5, Apr. 28, 2002, pp. 2064-2069, XP010589849, ISBN: 0-7803-7400-2.

(Continued)

*Primary Examiner* — Marcos Batista
(74) *Attorney, Agent, or Firm* — Slater-Matsil, L.L.P.

(57) ABSTRACT

The present invention discloses method for wireless network re-selection in a plurality of networks environment, comprising: when a user terminal changes from a current serving network to another network, sending a network re-selection request that includes a network information to a network side; establishing a connection of said another network if said another network indicated in said network re-selection request is different from said current serving network. By applying this method, the user terminal can re-select another network when already accessed to a network.

2 Claims, 9 Drawing Sheets

(56) References Cited

OTHER PUBLICATIONS

Hyo Soon Park et al: "Vertical Handoff Procedure and Algorithm between IEEE802.11 WLAN and CDMA Cellular Network", Lecture Notes in Computer Science, Springer Verglag, Berlin, DE, vol. 2524, Oct. 29, 2002, pp. 103-112, XP002391554, ISSN: 0302-9743.
"3$^{rd}$ Generation Partnership Project", ETSI Standards, European Telecommunications Standards Institute, Sophia-Antido, FR, vol. 3-SA, No. V230, Nov. 2003, XP014023920 ISSN: 0000-0001.
M. Jaseemuddin: "An Architecture for Integrating UMTS and 802.11 WLAN Networks", Computers and Communication, 2003. (ISCC 2003). Proceedings of the Eighth IEEE International Symposium on Jun. 30-Jul. 3, 2003, Piscataway, NJ, USA, IEEE, 2003, pp. 716-723, XP010646102, ISBN: 0-7695-1961-X.
"Broadband Radio Access Networks (BRAN", ETSI Standards, European Telecommunications Standards Institute, Sophia-Antipo, FR, vol. BR, No. V111, Jun. 2001, XP014022502, ISSN: 0000-0001.
"3rd Generation Partnership Project; Technical Specification Group Services and System Aspects; 3GPP system to Wireless Local Area Network (WLAN) Interworking; System Discription," (Release 6), Draft 3GPP TS 23.234, V1.8.0, Apr. 2003, pp. 1-65.

* cited by examiner

METHOD FOR WIRELESS NETWORK RE-SELECTION IN A PLURALITY OF NETWORKS ENVIRONMENT

CROSS-REFERENCE TO RELATED APPLICATIONS

This application is a continuation application of International Application No. PCT/CN2005/000078, filed Jan. 18, 2005, which claims priority in Chinese Application No. 2004-10039033.3, filed Jan. 21, 2004, both of which are entitled "Method for Wireless Network Re-Selection in a Plurality of Networks Environment". The full disclosure of these applications are hereby incorporated by reference.

FIELD OF THE TECHNOLOGY

The present invention relates to wireless network re-selection and access technique, more particularly to a method for wireless network re-selection in a plurality of networks environment.

BACKGROUND OF THE INVENTION

With the higher and higher request of the user for radio access rate, Wireless Local Area Network (WLAN) emerges as the times require, which can provide high-rate radio data access in a very small area. WLAN comprises various different techniques and the technical standard IEEE 802.1b is widely applied at present, which adopts 2.4 GHz frequency channel and the highest data transmission rate of 802.1b is 11 Mbps, therein IEEE 802.11g and Bluetooth technique also adopts this frequency channel, and the highest data transmission rate of 802.11g is 54 Mbps. Other new techniques like IEEE 802.11a and ETSI BRAN Hiperlan2 also adopt 5 GHz frequency channel and the highest transmission rate can be 54 Mbps.

Despite the various different radio access techniques, most of WLAN are used to transmit Internet Protocol (IP) packet data. As to a radio IP network, the adopted specific WLAN technique is generally transparent to the upper IP layer. The basic structure thereof is to utilize Access Point (AP) to fulfill user terminal's radio access and establish an IP transmission network through network control and connection equipment.

With the emergence and development of WLAN technique, interworking between WLAN and various radio mobile communication networks, like Global System for Mobile Communications (GSM), Code Division Multiple Access (CDMA) system, Wideband CDMA (WCDMA) system, Time Division-Synchronous CDMA (TD-SCDMA) system and CDMA 2000 system, is becoming the focus of current research. These kinds of networks are also called interworking networks, e.g. WLAN-3G interworking network. The present invention is more suitable for, but not limited to, these interworking networks. In the 3rd Generation Partner Project (3GPP) Organization for Standardization, user terminal can be connected with the Internet or Intranet through WLAN-AN, and can also be connected with a user's home network of 3GPP system or a visited network of 3GPP system through WLAN Access Network (WLAN-AN), specifically speaking, the WLAN user terminal is connected to a 3GPP home network through WLAN-AN when being locally accessed, namely, connected to a Home Public Land Mobile Network (HPLMN), as shown in FIG. 2; when the user terminal is roaming, it is connected with 3GPP visited network, namely a Visited Public Land Mobile Network (VPLMN), through WLAN-AN, and part of the entities in 3GPP visited network are respectively connected to corresponding entities in 3GPP home network, for instance, the 3GPP Authentication Authorization Accounting (AAA) proxy in 3GPP visited network and 3GPP Authentication Authorization Accounting (AAA) server in 3GPP home network; WLAN Access Gateway (WAG) in 3GPP visited network and Packet Data Gateway (PDG) in 3GPP home network, etc, as shown in FIG. 1. Thereby, FIG. 1 and FIG. 2 are schematic diagrams illustrating the framework for intercommunication between WLAN system and 3GPP system in the case of roaming and non-roaming respectively.

With the reference to FIG. 1 and FIG. 2, a 3GPP system mainly comprises Home Subscriber Server (HSS)/Home Location Register (HLR), 3GPP AAA server, 3GPP AAA proxy, WAG, PDG, Charging Gateway (CGw)/Charging Collection Function (CCF) and Online Charging System. User terminal, WLAN-AN and all entities of 3GPP system jointly constitute a 3GPP-WLAN interworking network, which can be taken as a WLAN service system. Thereby, 3GPP AAA server takes charge of authentication, authorization and accounting upon the user, collecting and transferring the charging information from WLAN-AN to charging system; PDG takes charge of transmitting the user data from WLAN-AN to 3GPP network or other packet networks, or vice versa; charging system is mainly in charge of receiving and recording user's charging information from the network, and OCS is in charge of instructing the network to periodically transmit online charging information according to charging situation of online charged user, as well as in charge of statistics and control.

In the case of non-roaming, when a WLAN user terminal expects to be directly accessed to Internet/Intranet, after finishing access authentication and authorization with AAA server (AS) through WLAN-AN, the user terminal can be accessed to Internet/Intranet through WLAN-AN. If the user terminal also expects to access 3GPP Packet Switch (PS) domain service, the user terminal can further apply to 3GPP home network for Scenario3 service, namely: WLAN user terminal requests AS of 3GPP home network for Scenario3 service authorization, AS of 3GPP home network performs service authentication and authorization upon this service authorization request, if successful, AS will send an access accept message to user terminal and allocate corresponding PDG for user terminal, the user terminal can access 3GPP PS domain service after the channel between user terminal and the allocated PDG is established. Meanwhile, according to network utilization situation of the user terminal, CGw/CCF and OCS records charging information. In case of roaming, when a WLAN user terminal expects to be directly accessed to Internet/Intranet, the user terminal can apply to 3GPP home network for accessing the Internet/Intranet through 3GPP visited network. If the user terminal also expects to further apply for Scenario 3 service and access 3GPP Packet Switch (PS) domain service, the user terminal needs to initiate a service authorization procedure towards 3GPP home network through 3GPP visited network, wherein the procedure thereof is also performed between user terminal and AS of 3GPP home network, if the authorization is successful, AS will allocate corresponding home PDG for the user terminal, and the user terminal can access 3GPP PS domain service after the channel between user terminal and the allocated PDG is established.

In a 3GPP-WLAN interworking network, if a WLAN is connected to a plurality of 3GPP visited networks at the same time, namely a plurality of mobile communication operational networks, the WLAN user terminal will have to select a desirable mobile communication operational network to access and the two schemes thereof are as shown in FIG. 3 and FIG. 4. Therein, FIG. 3 is a flowchart illustrating the successful procedure of the user terminal directly selecting a mobile communication operational network to access, comprising:

Step 301~303: after the radio connection between WLAN user terminal and WLAN-AN is established, the network, e.g. WLAN-3G network, or WLAN user terminal initiates the access authentication procedure, and WLAN-AN sends user identity request message to this WLAN user terminal; after receiving the request message, the WLAN user terminal returns a user identity response message with network selection information to the WLAN-AN. Hereby, the network selection information is information of the mobile communication operational network that the user terminal is accessing and to which WLAN network is connected; the access authentication procedure between WLAN-AN and user terminal is an Extendable Authentication Protocol (EAP) procedure. Generally, network selection information is contained in a user identifier field defined in Network Access Identifier (NAI) format.

Step 304~306: after receiving the message returned by user terminal, WLAN-AN judges whether the network selection information in the message belongs to the mobile communication operational network to which WLAN network is currently connected, if yes, WLAN-AN will determine the 3GPP AAA Proxy or 3GPP AAA Server of the mobile communication operational network selected by this user terminal, and then send user identifier and access authentication request to the 3GPP AAA Proxy or 3GPP AAA Server, so that 3GPP AAA Proxy or 3GPP AAA Server can authenticate and authorize the user, if the user passes the authentication and authorization, the subsequent access procedure will be executed.

FIG. 4 is a flowchart illustrating the procedure of user terminal re-selecting a mobile communication operational network to access when the initial selection is failed, comprising:

Step 401~403: completely the same as step 301~step 303.

Step 404~405: after receiving the message returned by user terminal, WLAN-AN detects that the network selection information in the message does not belong to the mobile communication operational network to which WLAN network is currently connected, and then sends a network advertisement message containing all mobile communication operational networks to which the WLAN-AN is connected.

Step 406~407: after receiving the network advertisement message, user terminal re-selects a mobile communication operational network to access according to information of the mobile communication operational network indicated in the advertisement message, and then sends a user identity response message with new network selection information to WLAN-AN.

Step 408~409: completely the same as step 305~306.

It can be seen from the above scheme that, well-established procedure of the user terminal selecting an access network already exists in 3GPP-WLAN intercommunication network, however, when a certain WLAN-AN is connected to a plurality of VPLMN networks, after certain user terminal is connected to one VPLMN network thereof through this WLAN-AN, if this user terminal need to disconnect from current connected VPLMN network and re-select another VPLMN network connected to this WLAN-AN because of charging or visited service scope or other reasons, there is no specific solving scheme put forward for this situation yet.

SUMMARY OF THE INVENTION

The technical scheme of the present invention is:

a method for wireless network re-selection in a plurality of operational networks environment, comprising:

when a user terminal changes from a current serving network to another network, sending a network re-selection request that includes a network information to network side; and establishing a connection of said another network if said another network indicated in said network re-selection request is different from said current serving network.

Because the network side can still perform authentication upon the new selected network without disconnecting the user terminal from the accessed network, the method for user terminal to re-select network provided in the present invention can shorten or even eliminate the time for releasing the connection between the user terminal and outside services, implement smooth re-selection procedure, increase the client's satisfaction degree as well as charging accuracy, thus interests of the service providers are protected. In addition, because the present invention only exerts few function requests upon user terminal and the network side, current processing procedure is hardly affected and the function of user terminal re-selecting an operational network to access is implemented by cooperating with current PLMN selecting procedure, so the present invention is of strong practicability. Moreover, the present invention can be flexibly implemented in various ways.

DETAILED DESCRIPTION OF PREFERRED EMBODIMENTS

The user terminal to re-select a network initiates a network re-selection request to the network side, after receiving the request, the network side compares the network selection information in the received request with information of the network to which current user terminal is currently accessed, if different, the network side will perform access procedure for the user terminal to the new selected network and release the connection between user terminal and the previous network.

In the present invention, precondition of user terminal's re-selecting a network is that this user terminal is already accessed to a network, and said accessed network hereby can be VPLMN or HPLMN of the user.

There may be many reasons why the user terminal needs to re-select a network, for instance: current accessed network charges more than anther one, so the user terminal wants to switch from current accessed network to another one, and so on. Hereby, said switch can be from HPLMN to VPLMN or from VPLMN1 to VPLMN2 or from VPLMN to HPLMN.

Figure 5:
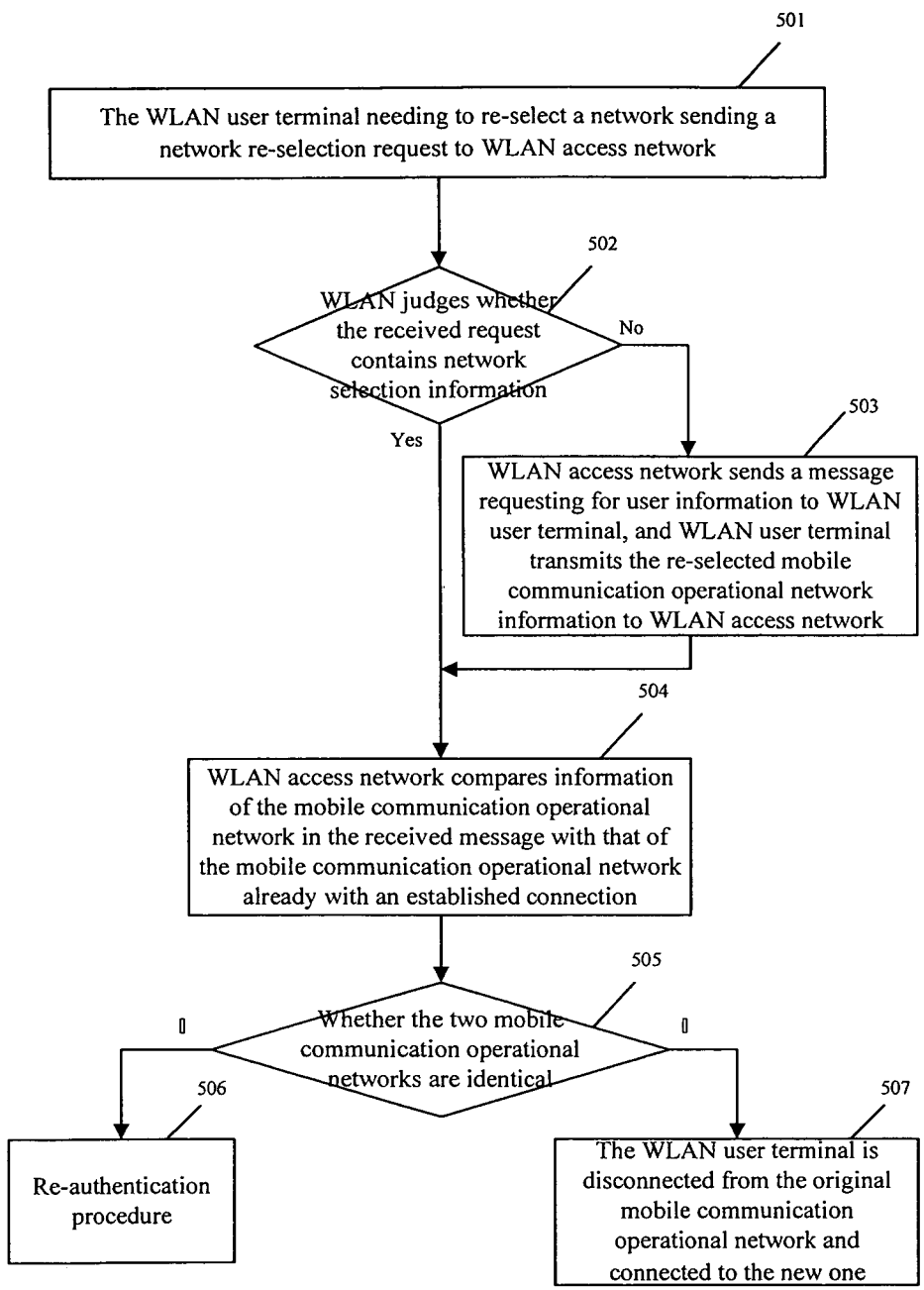
FIG. 5 is a schematic diagram illustrating processing procedure of present invention.

The procedure of WLAN user terminal re-selecting a mobile communication operational network in the present invention is as shown in FIG. 5, comprising:

Step 501: the WLAN user terminal to re-select a network sends a network re-selection request to WLAN-AN, indicating that the user terminal needs to access a new mobile communication operational network, for example switching from VPLMN1 to VPLMN2 means the user expects to access HPLMN through a new VPLMN; if the newly selected network is HPLMN, it means the user expects to access the HPLMN directly.

Therein, the 3GPP mobile communication operational network that the WLAN user terminal accesses at present can be a visited network or home network of the user. Said network re-selection request can be an access authentication request or be a disconnecting request, and the disconnecting request may further carry information of the mobile communication operational network newly selected by the WLAN user terminal.

Step 502~503: On receiving the network re-selection request, WLAN-AN judges whether the request comprises the needed network selection information, if yes, step 504 will be executed; otherwise, WLAN-AN will send a user information request message to WLAN user terminal, like requesting for user identity; after receiving the request message, WLAN user terminal will send a user identity response message with information of the newly selected mobile communication operational network to WLAN-AN. In the same way, information of this mobile communication operational network is placed in an identifier field defined in NAI format. In the current step, process in the otherwise condition is actually a procedure of starting the access authentication between WLAN-AN and WLAN user terminal, namely an Extendable Authentication Protocol (EAP) procedure.

Step 504~507: WLAN-AN compares information of the mobile communication operational network in the currently received user identity message with that of the accessed mobile communication operational network, if the two mobile communication operational networks are same, network will deem this is a normal authentication request from the WLAN user terminal in terms of current accessed mobile communication operational network, so the re-authenticating procedure will be completed and current network re-selection procedure will be ended; if different, WLAN-AN will complete the accessing procedure between WLAN user terminal and the new mobile communication operational network, and release the connection between WLAN user terminal and previous mobile communication operational network.

Figure 1:
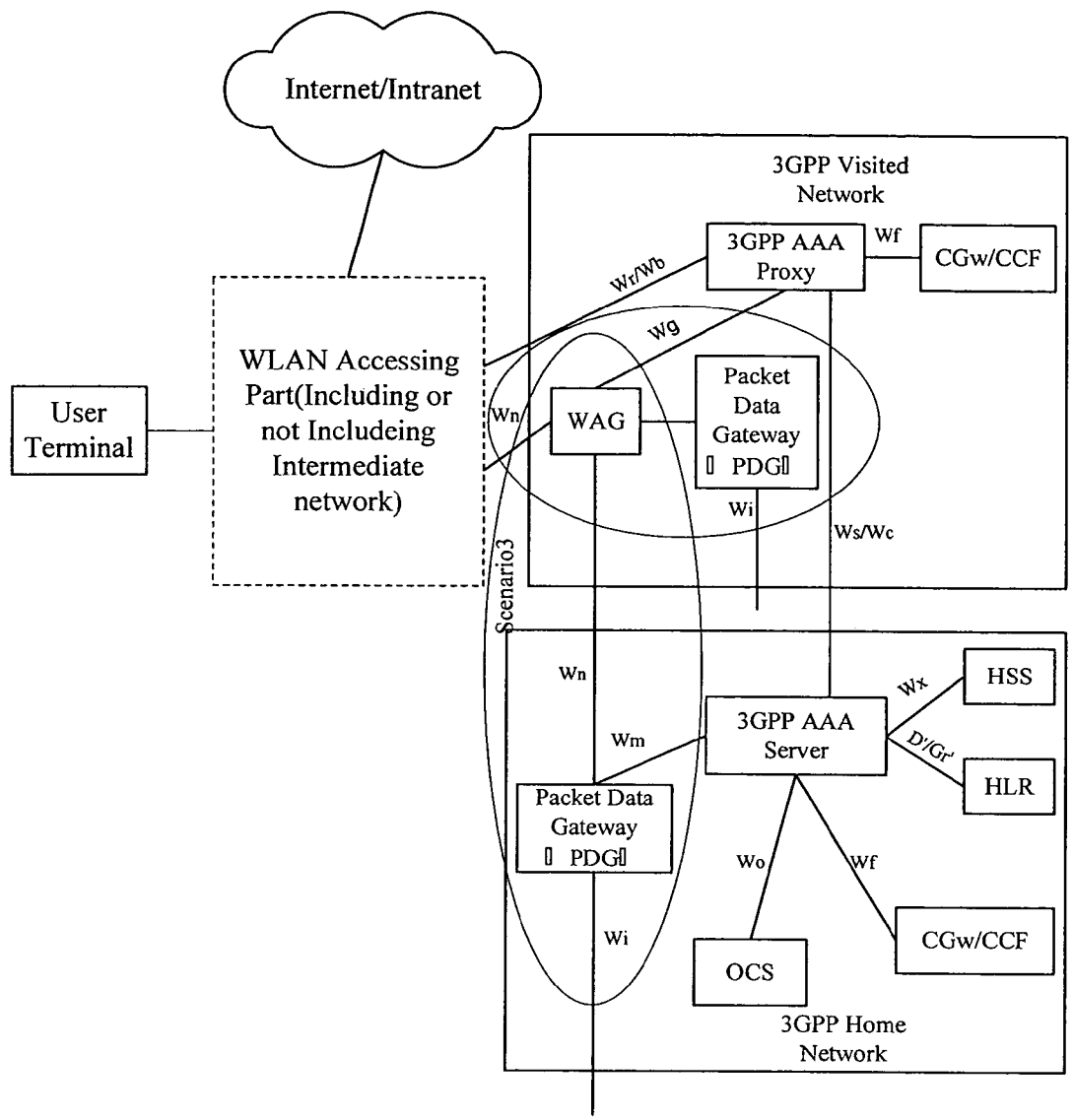
FIG. 1 is a schematic diagram illustrating structure of the intercommunication network between WLAN system and 3GPP system in case of roaming.
Figure 2:
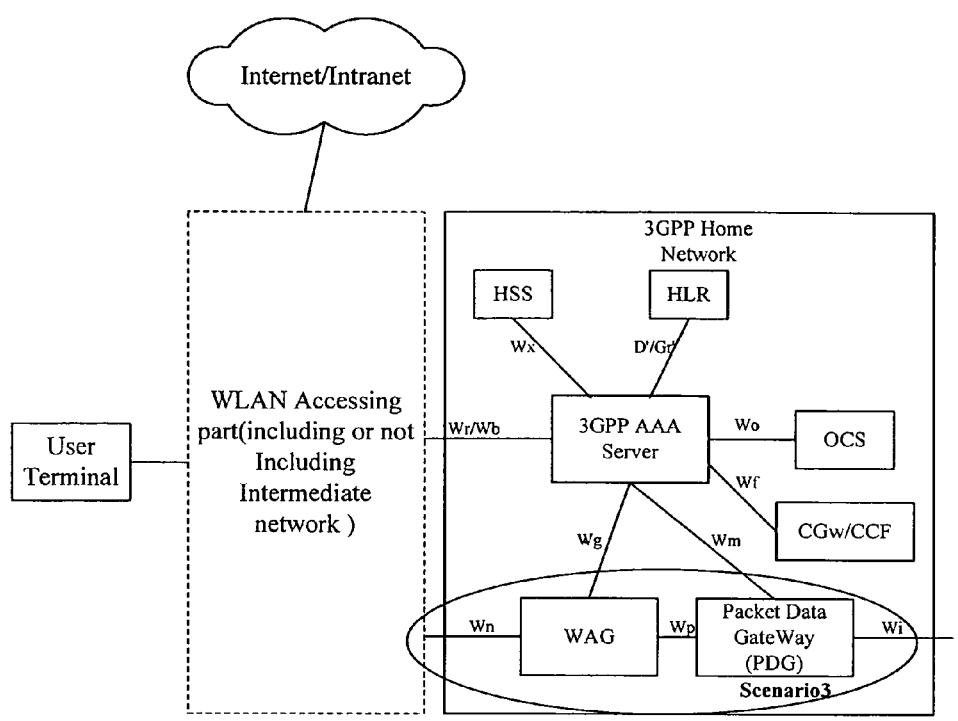
FIG. 2 is a schematic diagram illustrating structure of the intercommunication network between WLAN system and 3GPP system in case of non-roaming.
Figure 3:
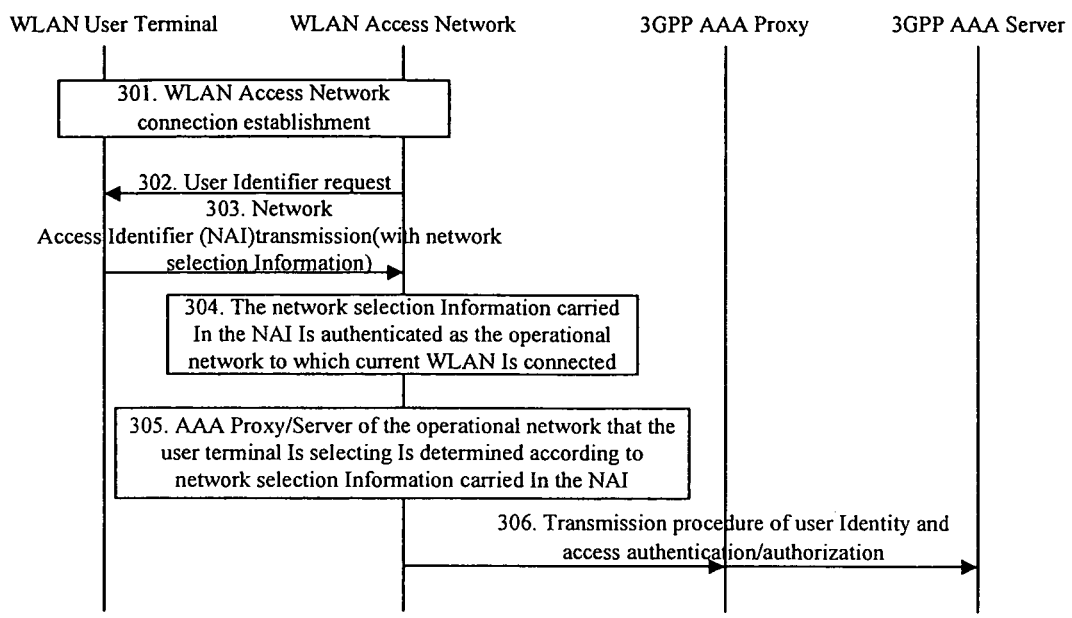
FIG. 3 is a flowchart of one embodiment illustrating the procedure of user terminal selecting a mobile communication operational network to access.
Figure 4:
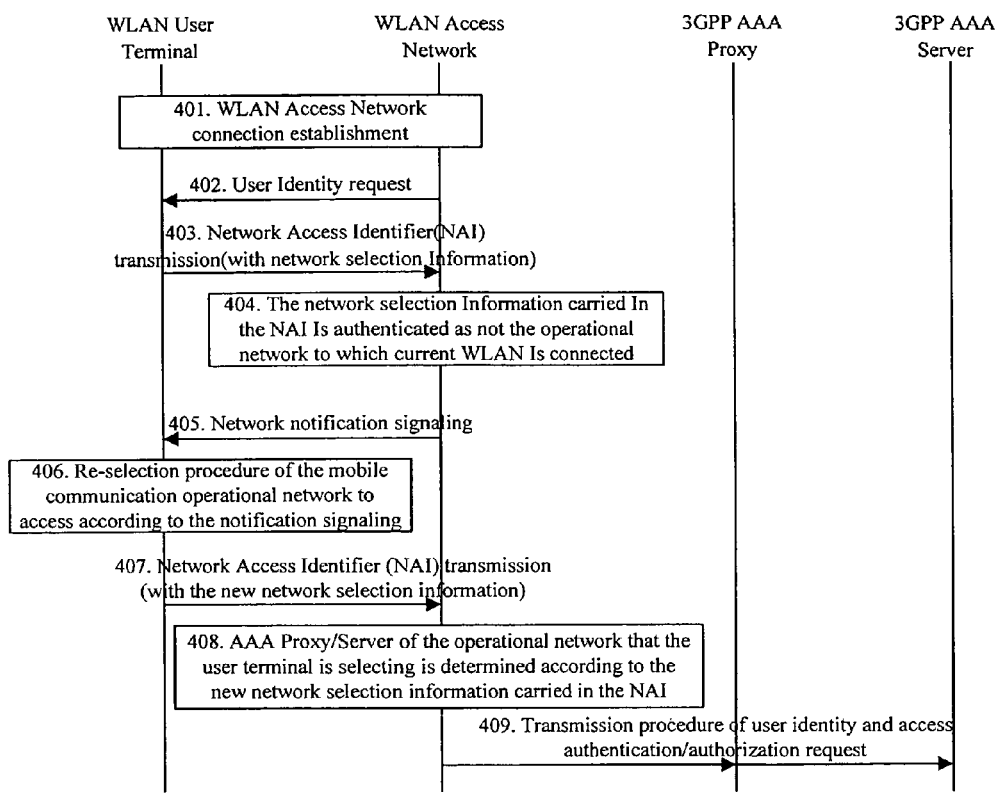
FIG. 4 a flowchart of another embodiment illustrating the procedure of user terminal selecting a mobile communication operational network to access.

Before connecting the WLAN user terminal to the newly selected mobile communication operational network, WLAN-AN needs to judge the validity of this mobile communication operational network, namely: judging whether the mobile communication operational network newly selected by WLAN user terminal is a 3GPP network to which current WLAN is connected. This judgment can be completed while comparing information of the mobile communication operational networks; or be performed after the connection to previous mobile communication operational network is broken down and before selecting the new mobile communication operational network. Hereby, if previous mobile communication operational network is different from the new one and the new one is not connected to current WLAN, the WLAN-AN will return re-selection failed notification and failure reason to this user terminal, send network advertisement message to the WLAN user terminal, transmit information of the connectable mobile communication operational networks to WLAN user terminal, and WLAN user terminal will re-select a proper mobile communication operational network to access according to step 406~409 in FIG. 4.

As to the disconnecting disconnection and connecting connection procedures in terms of previous mobile communication operational network and the new one, there are two situations: one situation is that WLAN-AN release the connection between WLAN user terminal and previous mobile communication operational network at first, and then finish authentication procedure toward the new mobile communication operational network selected by this WLAN user terminal; the other situation is that, after the WLAN user terminal passes the new authentication and accesses the newly selected mobile communication operational network, the WLAN access network releasing the connection between the WLAN user terminal and the previous mobile communication operational network.

As to the first situation, after finishing the disconnection operation, WLAN-AN sends said network re-selection request of WLAN user terminal to 3GPP AAA Proxy/3GPP AAA Server of the new mobile communication operational network selected by the user terminal and authenticate this WLAN user terminal. If the authentication is successful, WLAN-AN will establish a normal connection between WLAN user terminal and the new mobile communication operational network establish corresponding charging relation between itself and the new mobile communication operational network and finish the procedure of WLAN user terminal re-selecting a new mobile communication operational network.

As to the second situation, WLAN-AN directly sends said network re-selection request of WLAN user terminal to 3GPP AAA Proxy/3GPP AAA Server of the new mobile communication operational network selected by the user terminal, and authenticate this WLAN user terminal, wherein the authentication procedure will get home network of the user involved. Although the connection between this WLAN user terminal and previous mobile communication operational network is not broken down, home network of this WLAN user terminal has information of the previous connection, but the home network will still normally process the authentication upon the connection between this WLAN user terminal and original mobile communication operational network. If the authentication is successful, WLAN will generate the charging information, send the information to previous mobile communication operational network and release the connection between WLAN user terminal and previous mobile communication operational network; meanwhile, WLAN-AN establishes a normal connection between WLAN user terminal and the new mobile communication operational network, establishes corresponding charging relation between itself and the new mobile communication operational network, therein the charging information will be transmitted to the new mobile communication operational network later, and then finishes the procedure of WLAN user terminal re-selecting a mobile communication operational network. If the authentication is unsuccessful, there are two procedures according to the network configurations: one is to release the connection between WLAN user terminal and previous mobile communication operational network and this procedure is equivalent to an unsuccessful re-authentication in the communication procedure; the other one is to remind the user that re-selection of a new mobile communication operational network is unsuccessful, and connection with the previous mobile communication operational network will not be disconnected, but the network will request to re-authenticate the identifier based on previous mobile communication operational network.

In the above scheme, said procedure of releasing the connection between the mobile communication operational network and WLAN user terminal comprises: releasing the service connection, balancing the charging information and so on, and the specific processing procedure is the completely the same as the disconnection between WLAN user terminal and the normally connected mobile communication operational network.

Figure 6:
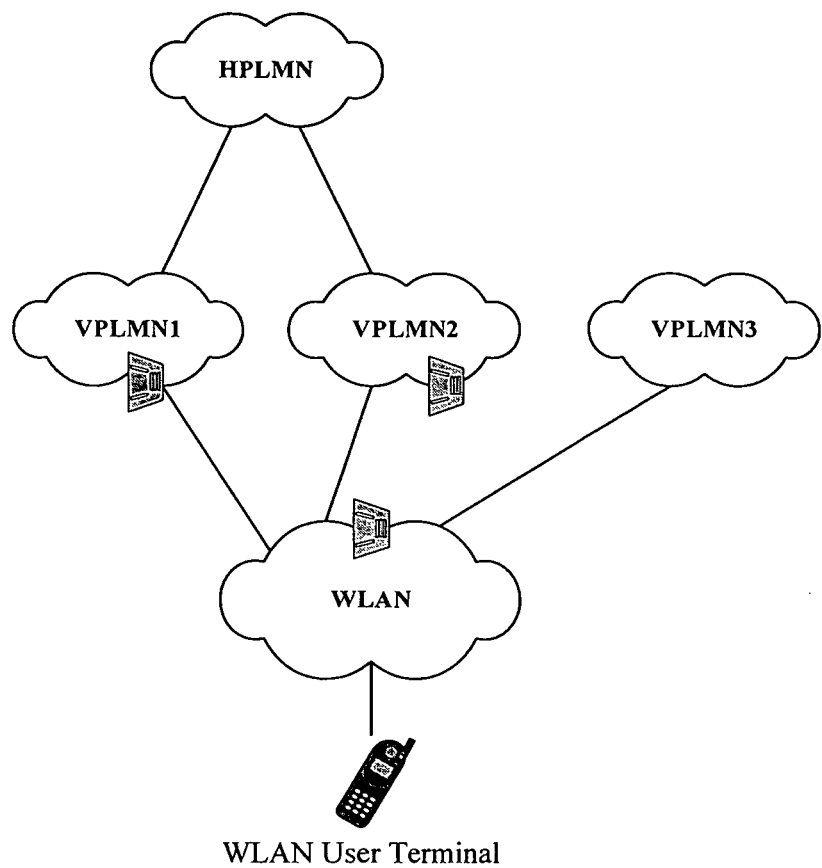
FIG. 6 is a schematic diagram illustrating network structure when WLAN is connected to a plurality of visited networks.

FIG. 6 shows the situation when WLAN-AN is connected to three VPLMN simultaneously, supposing the WLAN user terminal is already accessed to VPLMN1 through this WLAN-AN and now wants to switch to VPLMN2 from VPLMN1. Therein, VPLMN1 is corresponding to the original 3GPP AAA Proxy while VPLMN2 to the new 3GPP AAA Proxy. The procedure of WLAN user terminal re-selecting a mobile communication operational network to access will be described in detail hereinafter with reference to the accompanying drawings and nine embodiments.

Embodiment 1

Figure 7:
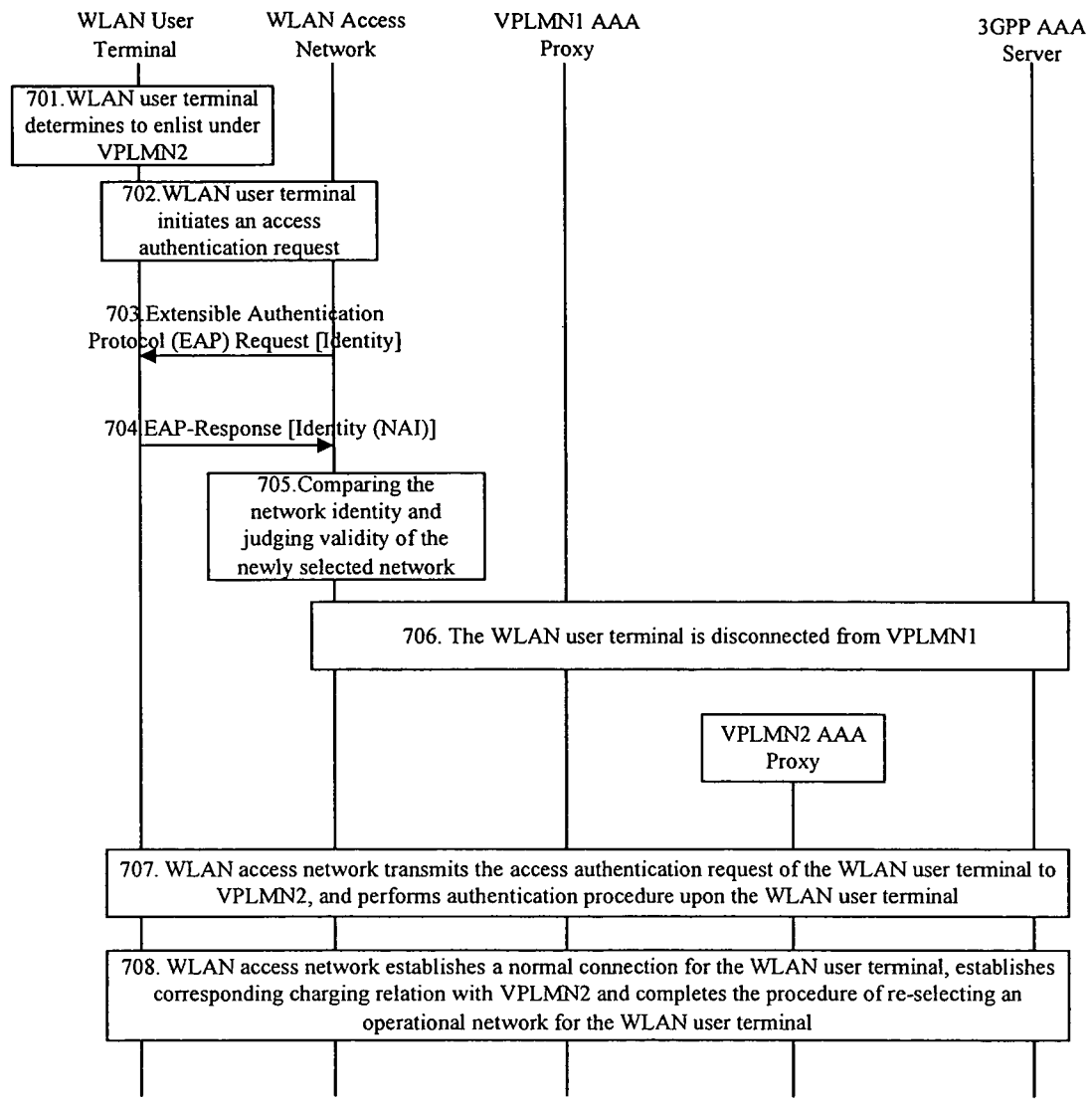
FIG. 7 is a flowchart illustrating the interactive procedure of re-selecting a network in embodiment 1.

In this embodiment, WLAN user terminal sends an access authentication request to WLAN-AN; comparing whether information of VPLMN1 is identical to that of VPLMN2; WLAN-AN release the connection between WLAN user terminal and VPLMN1 and then establishes the connection between WLAN user terminal and VPLMN2. Then, the procedure of WLAN user terminal re-selecting a mobile communication operational network to access is as shown in FIG. 7, comprising:

Step 701~702: WLAN user terminal determines to access VPLMN2 as the new mobile communication operational network, and confirms realm name or identifier of VPLMN2; WLAN user terminal sends an access authentication request to WLAN-AN without impacts on the existent connection with VPLMN1, namely, that WLAN. user terminal sends authentication start message EAP-Start to WLAN-AN.

Step 703~704: On receiving the access authentication request, WLAN-AN will start the access authentication procedure with user terminal, namely, the Extendable Authentication Protocol (EAP) procedure. Specifically speaking, WLAN-AN sends user identity request message EAP-Request[Identity] to user terminal requesting for user name; after receiving the request message, user terminal sends user identity response message EAP-Response[Identity] with user identifier field defined in NAI format to WLAN-AN, wherein the user identity field carries network selection information; this message may also carry identifier information to identify this information is for network re-selection.

Step 705~706: WLAN-AN compares information of VPLMN2 in the user identity response message with that of current accessed VPLMN1 and finds the two different, when detecting that VPLMN2 is connected to current WLAN AN, WLAN-AN starts disconnecting WLAN user terminal form VPLMN1, sends the charging information to VPLMN1 and then releases the service connection between WLAN user terminal and VPLMN1.

If it is detected that there is no direct connection, a network advertisement will be sent to the WLAN user terminal to notify the user terminal of all information of available VPLMN and wait for the user to re-select, just like the initial network selection process; but if it is detected one or several network advertisements have been sent to the user backward, it is optional not to send any notification according to the network configurations, just reject it directly. Therein, the times threshold of sending network advertisement can be preset thereof.

Step 707~708: after the connection between WLAN user terminal and VPLMN1 is released, WLAN-AN will send said access authentication request of WLAN user terminal to VPLMN2, and the request will also be routed to HPLMN of the user terminal to authenticate the WLAN user terminal; when the authentication is successful, WLAN-AN will establish a normal connection for WLAN user terminal, establish corresponding signaling and charging relation with VPLMN2 and finish the procedure of WLAN user terminal re-selecting a new mobile communication operational network.

Embodiment 2

Figure 8:
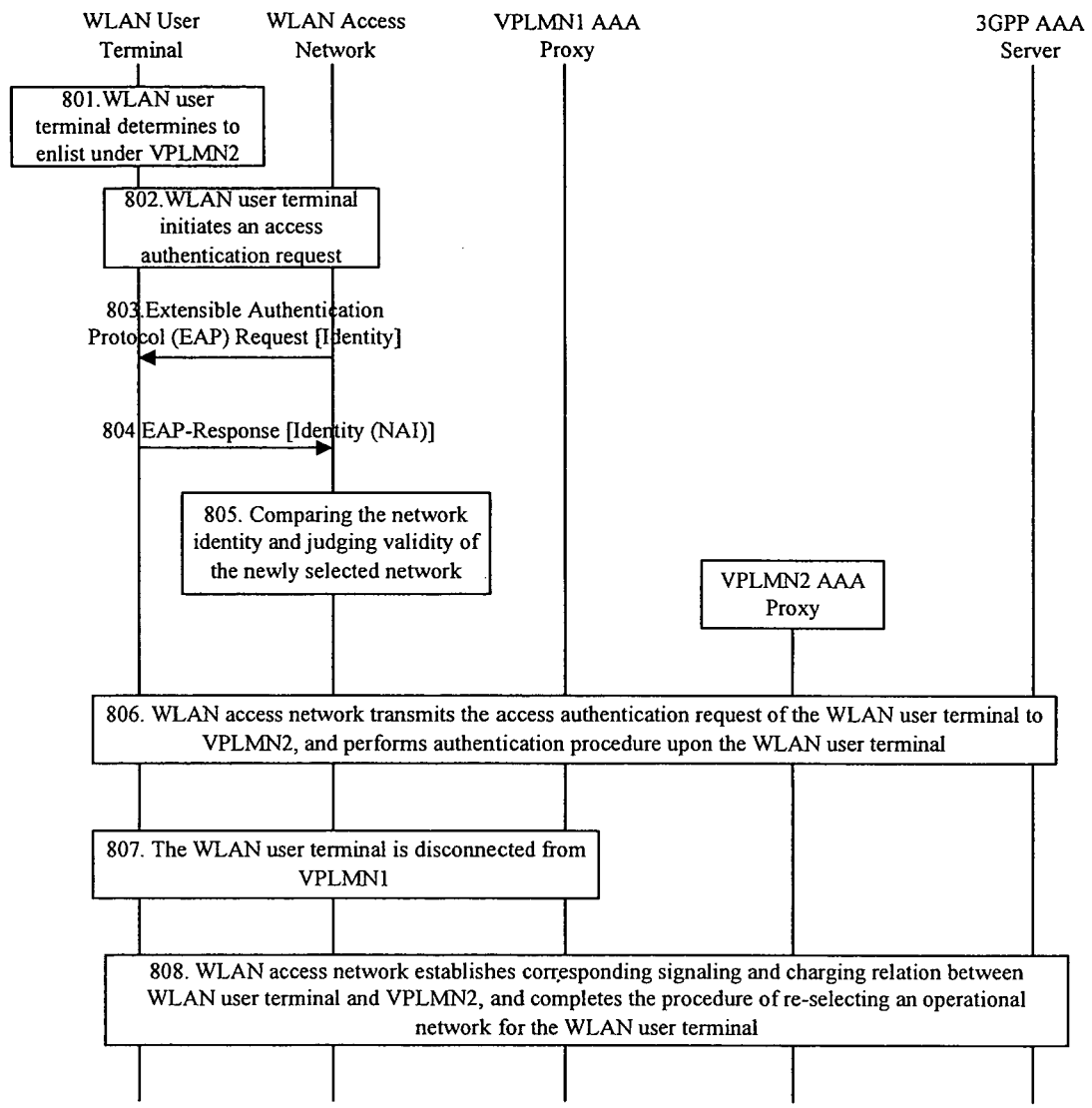
FIG. 8 is a flowchart illustrating the interactive procedure of re-selecting a network in embodiment 2.

In this embodiment, WLAN user terminal sends an access authentication request to WLAN-AN; while comparing whether information of VPLMN1 is identical to that of VPLMN2, WLAN-AN may judge the validity of VPLMN2; while reserving the connection between WLAN user terminal and VPLMN1, WLAN-AN establishes the connection between WLAN user terminal and VPLMN2, and disconnects the WLAN user terminal from VPLMN1 when said connection is successfully established. Then, the procedure of WLAN user terminal re-selecting a mobile communication operational network to access is as shown in FIG. 8, comprising:

Step 801~804: completely the same as step 701~704 of embodiment 1.

Step 805: WLAN-AN compares information of VPLMN2 in the user identifier response message with that of current accessed VPLMN1 and finds the two different, and when WLAN-AN detects VPLMN2 is connected to current WLAN, step 806 will be executed.

If it is detected that there is no direct connection between WLAN and VPLMN2, a network advertisement will be sent to user terminal to notify the user terminal of all information of available VPLMN and wait for the user to re-select, just like the initial network selection process; but if it is detected one or several network advertisements have been sent to the user backward, it is optional not to send any notification with a direct rejection. Therein, the times threshold of sending network advertisement can be preset thereof.

Step 806: WLAN network sends said access authentication request of WLAN user terminal to VPLMN2, and the request will also be routed to HPLMN of the user terminal to authenticate the WLAN user terminal; since the user terminal is never disconnected from VPLMN1, HPLMN already has information of the user terminal, but HPLMN will still perform the normal authentication after receiving the authentication information from VPLMN2.

Step 807: when the authentication is successful, WLAN-AN will start disconnecting the user terminal from VPLMN1 and sending the charging information to VPLMN1; meanwhile, WLAN-AN will establish corresponding signaling and charging relation with VPLMN2 and finish the procedure of WLAN user terminal re-selecting a new mobile communication operational network.

In the present invention, when establishing the connection between VPLMN2 and WLAN user terminal, the connection between this user terminal and VPLMN1 is not disconnected.

Embodiment 3

Figure 9:
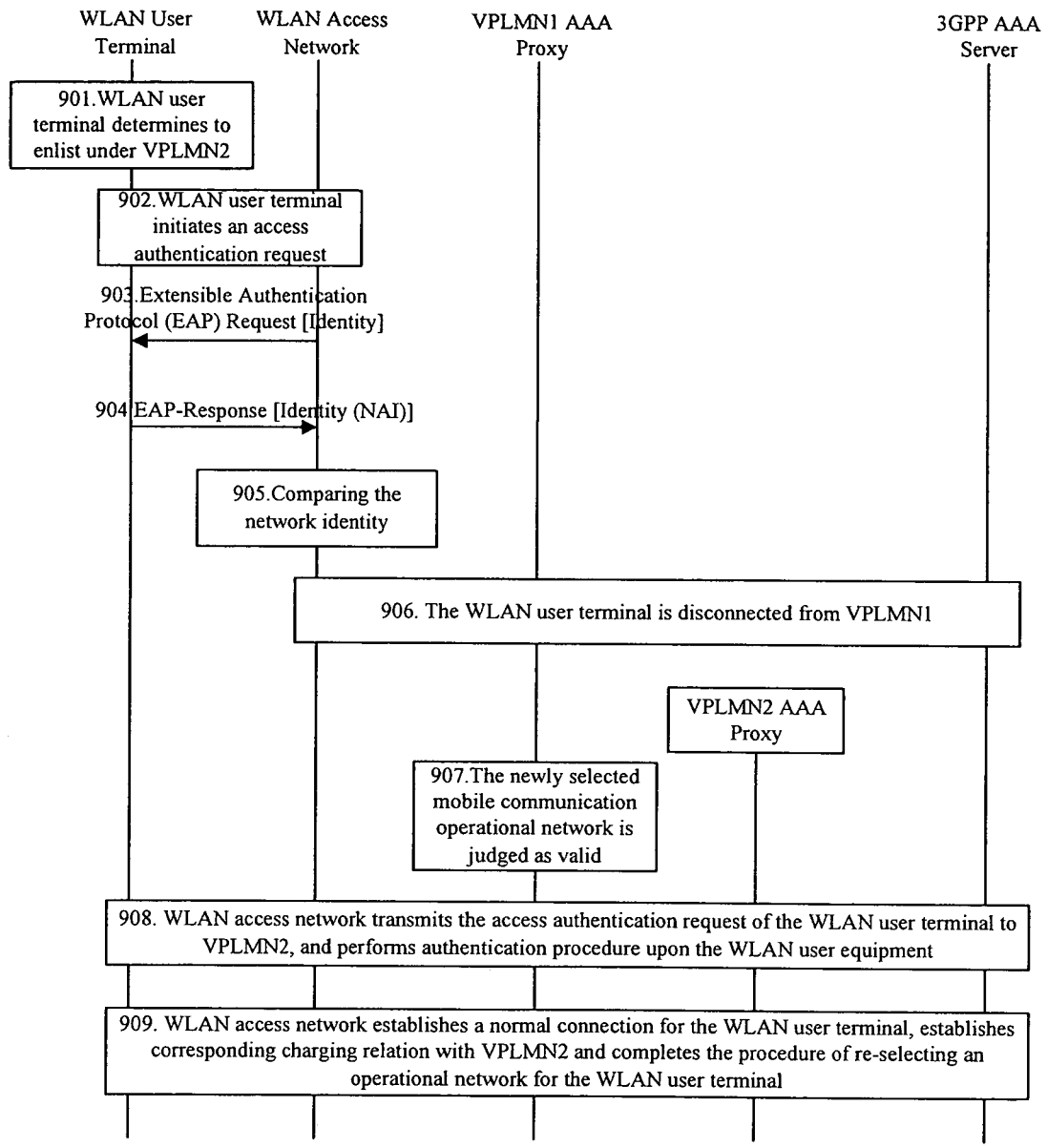
FIG. 9 is a flowchart illustrating the interactive procedure of re-selecting a network in embodiment 3.

In this embodiment, WLAN user terminal sends an access authentication request to WLAN-AN; WLAN-AN releases the connection between WLAN user terminal and VPLMN1 and then establishes the connection between WLAN user terminal and VPLMN2; and WLAN-AN may judge the validity of VPLMN2 after breaking down the connection between WLAN user terminal and VPLMN1. Then, the procedure of WLAN user terminal re-selecting a mobile communication operational network to access is as shown in FIG. 9, comprising:

Step 901~904: completely the same as step 701~704 of embodiment 1.

Step 905~906: WLAN-AN compares information of VPLMN2 in the user identifier response message with that of current accessed VPLMN1 and finds the two different, when detecting that there is information of re-selecting a network in the user identity response message, WLAN-AN will start disconnecting WLAN user terminal form VPLMN1, send the charging information to VPLMN1 and then break down the service connection between WLAN user terminal and VPLMN1.

Step 907~909: after the connection between WLAN user terminal and VPLMN1 is released, WLAN network judges whether VPLMN2 is the mobile communication operational network to which current WLAN is connected, when detecting VPLMN2 is the mobile communication operational network to which current WLAN is connected, WLAN-AN will send said access authentication request of WLAN user terminal to VPLMN2, and the request will also be routed to HPLMN of the user terminal to authenticate the WLAN user terminal; when the authentication is successful, WLAN-AN will establish a normal service connection for WLAN user terminal, establish corresponding signaling and charging relation with VPLMN2 and finish the procedure of WLAN user terminal re-selecting a new mobile communication operational network.

If it is detected that there is no direct connection between WLAN and VPLMN2, a network advertisement will be sent to user terminal to notify the user terminal of information of all VPLMN connected to current WLAN and wait for the user to re-select, just like the initial network selection process; but if it is detected one or several network advertisements have been sent to the user backward, it is optional not to send any notification according to the network configurations, just reject it directly. Therein, the times threshold of sending network advertisement can be preset thereof.

Embodiment 4

In this embodiment, WLAN user terminal sends a disconnection request to WLAN-AN, and this request does not contain information of the newly selected mobile communication operational network, so the network selection information has to be obtained by way of authentication procedure; while comparing whether information of VPLMN1 is identical to that of VPLMN2, WLAN-AN may judge the validity of VPLMN2; WLAN-AN release the connection between WLAN user terminal and VPLMN1 and then establishes the connection between WLAN user terminal and VPLMN2. Then, all processing steps of the present embodiment are basically the same as that of embodiment 1, while the difference lies in the request sent by WLAN-AN by WLAN user terminal.

Embodiment 5

In this embodiment, WLAN user terminal sends a disconnection request to WLAN-AN, and this request does not contain information of the newly selected mobile communication operational network, so the network selection information has to be obtained by way of authentication procedure; while comparing whether information of VPLMN1 is identical to that of VPLMN2, WLAN-AN may judge the validity of VPLMN2; while reserving the connection between WLAN user terminal and VPLMN1, WLAN-AN establishes the connection between WLAN user terminal and VPLMN2, and disconnects the WLAN user terminal from VPLMN1 when said connection is successfully established. Then, all processing steps of the present embodiment are basically the same as that of embodiment 2, while the difference lies in the request sent to WLAN-AN by WLAN user terminal.

Embodiment 6

In this embodiment, WLAN user terminal sends a disconnection request to WLAN-AN, and this request does not contain information of the newly selected mobile communication operational network, so the network selection information has to be obtained by way of authentication procedure; WLAN-AN releases the connection between WLAN user terminal and VPLMN1 and then establishes the connection between WLAN user terminal and VPLMN2; and WLAN-AN may judge the validity of VPLMN2 after releasing the connection between WLAN user terminal and VPLMN1. Then, all processing steps of the present embodiment are basically the same as that of embodiment 3, while the difference lies in the request sent to WLAN-AN by WLAN user terminal.

Embodiment 7

In this embodiment, WLAN user terminal sends a disconnection request to WLAN-AN, and this request contains information of the newly selected mobile communication operational network; while comparing whether information of VPLMN1 is identical to that of VPLMN2, WLAN-AN may judge the validity of VPLMN2; WLAN-AN releases the connection between WLAN user terminal and VPLMN1 and then establishes the connection between WLAN user terminal and VPLMN2; then, comparing the processing steps with that of embodiment 1, besides the difference in the request sent to WLAN-AN by WLAN user terminal, this embodiment's processing steps omit the step 703 and step 704, so that there is no need to request information of VPLMN2 from WLAN user terminal because WLAN-AN can obtain it directly.

Embodiment 8

In this embodiment, WLAN user terminal sends a disconnection request to WLAN-AN, and this request contains information of the newly selected mobile communication operational network; while comparing whether information of VPLMN1 is identical to that of VPLMN2, WLAN-AN may judge the validity of VPLMN2; while reserving the connection between WLAN user terminal and VPLMN1, WLAN-AN establishes the connection between WLAN user terminal and VPLMN2, and disconnects the WLAN user terminal from VPLMN1 when said connection is successfully established. Then, comparing the processing steps with that of embodiment 2, besides the difference in the request sent to WLAN-AN by WLAN user terminal, this embodiment's processing steps omit the step 803 and step 804, so that there is no need to request information of VPLMN2 from WLAN user terminal because WLAN-AN can obtain it directly.

Embodiment 9

In this embodiment, WLAN user terminal sends a disconnection request to WLAN-AN, and this request contains information of the newly selected mobile communication operational network; WLAN-AN releases the connection between WLAN user terminal and VPLMN1 and then establishes the connection between WLAN user terminal and VPLMN2; and WLAN-AN may judge the validity of VPLMN2 after releasing the connection between WLAN user terminal and VPLMN1. Then, comparing the processing steps with that of embodiment 3, besides the difference in the request sent to WLAN-AN by WLAN user terminal, this embodiment's processing steps omit the step 903 and step 904, so that there is no need to request information of VPLMN2 from WLAN user terminal because WLAN-AN can obtain it directly.

In above descriptions, said network side is WLAN access network or WLAN access network with an authentication server, or mobile communication operational network, or mobile communication operational network with an authentication server, or a specific server which performing the judgment. The authentication server may be an AAA server.

The above descriptions are just preferable embodiments of the present invention and are not used to confine protection scope of the present invention.

The invention claimed is:

1. A method for wireless network re-selection in a plurality of networks environment, the method comprising:
   receiving, by a Wireless Local Area Network Access Network (WLAN-AN), a network re-selection request sent from a user terminal (UE) that is connected to a current serving network through the WLAN-AN, the network re-selection request comprising information of another network;
   performing an authentication procedure toward said another network upon the information of said another network to establish a connection of said another network through the WLAN-AN; and
   releasing the connection between the UE and the current serving network after the UE passes the authentication procedure;
   wherein said network reselection request is an access authentication request or disconnecting request;
   wherein before performing the authentication procedure toward the another network selected by the UE, judging validity of a second serving network, if the another network selected by the UE is one to which the WLAN-AN is connected according to the received information of said another network, performing with the authentication procedure; otherwise, sending a network advertisement that comprises information of all Visited Public Land Mobile Networks, VPLMN, connected to the WLAN-AN to the UE and waiting for the UE to re-select a network; and
   presetting a maximum times of sending the network advertisement as a threshold, before sending the network advertisement to the UE, if the times of sending the network advertisement reaches the threshold, sending access failure information to the UE; otherwise, sending the network advertisement that comprises information of all the VPLMN connected to the WLANAN to the UE and waiting for the UE to re-select a network.

2. A method for wireless network re-selection in a plurality of networks environment, the method comprising:
   receiving, by a Wireless Local Area Network Access Network (WLAN-AN), a network re-selection request sent from a user terminal (UE) that is connected to a current serving network through the WLAN-AN, the network re-selection request comprising information of another network;
   performing an authentication procedure toward said another network upon the information of said another network to establish a connection of said another network through the WLAN-AN; and
   releasing the connection between the UE and the current serving network after the UE passes the authentication procedure;
   wherein said WLAN-AN comprises a WLAN access network or a WLAN access network with an authentication server or operational network, or operational network with an authentication server, or a specific server which performs the wireless network re-selection; and
   wherein the authentication server is an Authentication, Authorization, Accounting (AAA) server.

* * * * *